United States Patent Office 3,767,722
Patented Oct. 23, 1973

3,767,722
PROCESS FOR ALKYLATING ALKYL BENZENES
Irving Schwager, Hopewell Junction, N.Y., assignor to
Texaco Inc., New York, N.Y.
No Drawing. Filed Dec. 13, 1971, Ser. No. 207,551
Int. Cl. C07c 3/52
U.S. Cl. 260—668 B                    9 Claims

ABSTRACT OF THE DISCLOSURE

This process concerns the alkylation of monoalkylated, mononuclear aromatics through the free radical initiated addition of the aromatics to olefins.

This invention concerns a novel and more selective [1] catalytic addition of olefins to aromatic compounds.

More particularly, this invention relates to the free radical addition of toluene to olefins under relatively mild reaction conditions of temperature and pressure to produce predominantly highly linear alkyl groups in the alkylated aromatics.

BACKGROUND OF THE INVENTION

Alkylated aromatics are useful compounds per se but are particularly valuable as intermediates in organic synthesis for the preparation of other commercially useful compounds. For example, ethylbenzene and its homologs are manufactured in good quantities, a large proportion of which are consumed in the preparation of plastics and polymers. A relatively new and important large scale application is in the preparation of biodegradable detergents through the sulfonation of predominantly linear alkyl benzene precursors. Unfortunately, most methods for alkylating benzene such as the addition of alpha ($\alpha$) olefins (obtained through thermal or catalytic cracking of wax, ethylene polymerization and various other processes) favor the formation of considerable branched alkyl chains which are tedious and costly to remove from the more desirable primarily linear alkylated benzene. Illustrative of some of the prior art processes are the acid catalyzed additions represented by the generic reaction shown below in the alkylation of benzene:

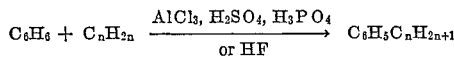

$$C_6H_6 + C_nH_{2n} \xrightarrow[\text{or HF}]{\text{AlCl}_3,\ H_2SO_4,\ H_3PO_4} C_6H_5C_nH_{2n+1}$$

Due to the tendency of the above described catalyzed additions of olefins to benzene to afford such branched alkylated aromatic products, the development of other alkylation procedures which produce much larger proportions of linear alkyl groups of the alkylated aromatic product is desirable and would represent an advance in the art.

The alkylation of toluene and its alkyl homologues such as ethyl benzene, and cumene (isopropyl benzene) has been carried out extensively by thermally initiated free radical reactions. Representative samples of this type of reaction are disclosed in U.S. 2,758,140 to Ipatieff et al., and an article by Pines et al. in J.A.C.S., 79, pp. 4958 et seq. (1957). The former thermal process requires relatively high temperatures ranging from 350–500° C. and pressures up to 12,000 p.s.i.g., and results in alkylation at the side chain of the alkyl group. The latter also employs high temperatures (400–485° C.) combined with high pressures (over 6000 p.s.i.g.).

Recently the inventor has discovered an alkylation process which obviates the disadvantages of the prior art. Reaction conditions such as temperature and pressure are surprisingly mild, and unlike the acid catalyzed art, the alkylation procedure is particularly valuable in toluene and other aralkyl reactants. In addition, better selectivity to linear alkylaromatics is generally obtained in the inventive process with monoalkylated mononuclear aromatics with higher $\alpha$-olefins than was disclosed in the above prior art references.

It is therefore an object of this invention, among others, to provide a novel and improved process to prepare predominantly linear alkyl monosubstitutes of aromatic nuclei, through the addition of aralkyl reactants to olefins by the use of free radical initiation catalysts.

A more specific object of this invention is to further alkylate toluene and its higher homologues through the free radical catalyzed addition of toluene and its homologues to olefins under mild reaction conditions of temperature and pressure.

Further objects will suggest themselves to those skilled in the art, after a perusal of this application.

In the broadest contemplated practice of this invention toluene and its monoalkylated homologues are added to mono olefins containing from 2 to 30 carbon atoms, in the presence of free radical initiator, to produce predominantly linear alkyl chains on the aromatic nucleus. The process comprises:

(a) Contacting an admixture of toluene or its higher homologues with said mono olefins at temperatures up to 210° C. and at superatmospheric pressures, in the presence of at least a catalytic quantity of at least one free radical initiator until the addition of the toluene (or its homologues) takes place with the formation of longer,[2] predominantly linear alkyl groups on the aromatic nucleus, and (b) Separating said predominantly linear alkylated aromatics contained therein.

In the favored and most specific practice of this invention predominantly linear alkyl substituents of toluene are prepared in good yield, substantially free from contaminants by the process comprising:

(a) Preparing an admixture of toluene and less than a stoichometeric quantity of at least one mono olefin containing from about 2 to 30 carbon atoms.

(b) Adding at least a catalytic quantity of free radical initiator having a decomposition half life at temperature between 175° and 210° C. of between 1 hour and 0.1 hour to said admixture and (c) Heating said admixture of toluene, olefin and catalyst at temperatures between 175° and 210° C. at autogenous pressures ranging between 100 and 300 p.s.i.g., for a period of 0.2 to 1 hour, and (d) Separating said predominantly linear alkylated toluene contained therein.

In order to more readily aid in the understanding of the inventive concept, the following additional disclosure is submitted;

(A) Olefins

The olefins which serve as substrates for the free radical addition of benzyl type radicals to them are linear aliphatic mono olefins. The olefins which can range in carbon atoms from 2 to 30 can be in the form of a single, discrete mono olefin or mixtures of two or more mono olefins. Dienes and trienes are to be avoided since they greatly increase the number of contaminants and produce

---

[1] Selective or selectivity as used throughout this application is the efficiency in catalyzing a desired reaction relative to other undesired reactions. In the instant application, the formation of predominantly linear (straight chain) alkyl groups of the alkylated aromatic nucleus. Selectivity is usually expressed on a percentile basis, calculated by determining the amount of predominantly linear alkyl groups of the alkylated aromatics formed, divided by the total amount of olefin converted and multiplying the quotient obtained by 100.

[2] For example, the addition of toluene to 1-tetradecene results in the formation of a pentadecyl group on the aromatic nucleus.

mixtures of both linear and branched chain substituents on the aromatic ring. The favored olefinic substrates are the alpha (1-mono olefins) and the 2-olefins containing 3 to 25 carbon atoms. This range of mono olefins is favored because they are available in good supply, in relatively uncontaminated form and most important they are readily added to toluene and its higher homologues to produce predominantly linear alkyl groups under relatively mild reaction conditions. The lower cyclic mono olefins ($C_5$–$C_7$) do not appear to be useful in the inventive process.

(B) Monoalkylated mononuclear aromatics

The aromatic substrates which coreact with the olefins in the presence of free radical initiator consist of toluene and its monoalkylated homologues. Illustrative of these are toluene, ethyl benzene, n-propyl benzene, n-butyl benzene, n-pentyl benzene and mixtures of these substrates wherein the original alkyl group contains 1 to 6 carbon atoms. The favored aromatic substrate is toluene because it readily undergoes alkylation in the methyl side chain to form substantially linear alkyl groups and because it is available in large quantities, in a high state of purity. The resultant reaction product is a predominantly linear alkylated phenyl product containing at least 2 more carbon atoms where ethylene is the olefin added to an alkylated phenyl.

(C) Reaction conditions

The following disclosure summarizes the salient reaction parameters followed throughout the novel alkylation process, using as the prime criteria of success, the conversions of olefins and selectivities of linear alkylated aromatics found.

(1) Reaction temperatures.—As will be seen by a study of the data presented in the tables of this specification, temperatures between 175° C. and 210° C. are the most consistent to produce the desired linear monoalkylated aromatic of this invention. Using toluene as typical of aromatic substrates to be added to the olefin and 1-tetradecene as the olefin coreactant and tertiary-butyl peroxide as initiator, temperatures below this range produce little of the desired products within a reasonable reaction time. On the other hand, reaction temperatures substantially above this range while utilizable offer no concomitant gain in either conversions or selectivity.

(2) Reaction pressures.—Reaction pressures do not have an appreciable effect on conversions and selectivities. Autogenous pressures are generated which depend on the vapor pressures of the alkyl aromatic starting material, the olefin substrate, the alkyl aromatic product and the initiator decomposition products at the reaction temperature. For example, when toluene-, 1-octene- and t-butyl peroxide are employed, autogenous pressures between about 100 and 300 p.s.i.g. are obtained when reaction temperatures between 175° C. and 210° C. are used.

(3) Free radical initiators.—The choice of initiator is relatively flexible as long as the initiator has a reasonable half-life at the reaction temperature which will permit the catalyst to initiate the reaction at a reasonably rapid rate within the operating temperature range. Suitable initiators include tertiary butylperoxide, methyl ethyl ketone peroxides, cumene hydroperoxide, and/or t-butylhydroperoxide. The preferred initiator is tertiary butylperoxide. This preference is based primarily upon its relatively long half-life between 175° and 210° C. as well as upon the conversions and selectivities obtained during its use.

The free radical initiator (catalyst) must be present in at least a catalytic (or an initiating) amount to obtain substantial quantities of the linear, alkylated side chain aromatic product. This amount will vary according to the initiator employed and the amount of olefin present in the charge. When t-butylperoxide is used as initiator, a mole ratio of from about 2 to 0.5 mole of olefin for each mole of initiator can be used effectively. However, a narrower ratio of from about 1 to 0.8 mole of olefin per mole of initiator produces the best balance of mild reaction conditions, olefin conversions and selectivity and therefore constitutes the preferred range of initiator.

(4) Reaction time.—The reaction time or contact time is the period of time that the two reactants remain in contact with each other in the presence of at least a catalytic amount of initiator. This is a variable dependent primarily upon the reaction temperature and initiator, and to a lesser extent, upon the olefin used and its concentration. In the operating temperature range of about 175° C. to 210° C. reaction times can very from as much as 0.1 hour to 10 hours. However, usually when operating under optimum reaction conditions a much narrower time range, 0.2 to 1 hour, is feasible.

(5) Ratio of monoalkylated aromatics to olefins.— Consistently high conversions and selectivities have been obtained when large molar excesses of the monoalkylated mononuclear aromatic, typified by toluene, to olefins have been used. For example, where tertiary butylperoxide is used as the initiator and the reaction is run within the preferred reaction parameters of temperatures and pressures, molar ratios of toluene of 100 to 150 to 1 olefin have been successfully used. Lower ratios can be used but appear to offer no advantage.

(D) Experimental procedure

Method I.—An appropriately sized reaction vessel or reactor equipped with heating and agitating means, and capable of being pressurized, as well as having liquids introduced or removed through valves while under pressure (without substantial loss of pressure) is charged with monoalkylated mononuclear aromatics such as toluene and olefin. The vessel is sealed, pressure tested, deoxygenated with an inert gas such as gaseous nitrogen, argon, neon, etc. and is heated to the desired temperature. At this time the desired quantity of free radical initiator and olefin, or free radical initiator alone, is introduced through an appropriate device (such as a pressurized side ampoule) into the system containing the agitated heated mixture of toluene and olefin. During the reaction, its course may be monitored by gas chromatographic analyses (g.c.) by periodically withdrawing samples through the sampling valve, without depressurizing, and subjecting them to analysis. After monitoring, or when experience with the system indicates the reaction is complete, the reactor is cooled, depressurized and the reaction mixture removed. Volatiles are stripped off by distillation, preferably using a vacuum distillation technique, and the distillate discarded after analysis indicates the absence of product. The non-volatile residue is further treated by chromatography or it can be fractionally distilled under high vacuum (less than 10 mm. of Hg) to effect separation. Analytical methods such as gas chromatography, nuclear magnetic resonance, mass spectroscopy and appropriate elemental analysis are used to confirm that the desired alkylated aromatic addition product is produced.

Method II.—Alternatively, in a modification of the procedure toluene, olefin and initiator are added concurrently, either in the same or different solutions, to the cool reaction vessel or reactor. In this procedure the unheated reactor containing the three components is sealed and pressure-tested with inert gas (i.e., nitrogen) as above. Nitrogen pressure, usually about 10 p.s.i.g., is left in the sealed reactor and the reactor is heated rapidly to the desired reaction temperature and the autogenous pressure noted. Again the reaction course can be monitored as before, during and after heating to the desired temperature. At the point when analysis (usually gas chromatographic) shows that the substantial conversion of olefin has taken place and no further product formation is likely, the reaction is terminated and the reactor is cooled and depressurized. Again, removal of volatiles by evaporation is undertaken and the residue is vacuum distilled or chromatographed to resolve it into the desired alkylated aromatic product free from impurities. When chromatography is employed, a column of chromatographic grade neutral alumina, silica or the like is employed and elution is preferably accomplished using a solvent having favorable separation characteristics.

Having described the inventive process in general terms, the following examples are submitted to supply more specific examples. In all instances unless indicated otherwise all parts and percentages are by mole rather than weight or volume and degrees are expressed in °C. rather than °F.

EXAMPLE 1

Preparation of a linear alkylated aromatic

Toluene[3] is added to 1-alkenes by the general procedure previously described as Method I. Details are as follows:

Part A.—A 300 ml. capacity autoclave (containing heating, cooling and agitation means, and capable of being pressurized and permitting the injection of or removal of liquids without depressurizing) is charged with 1.44 moles of toluene and 0.015 mole of 1-octene at room temperature and subsequently sealed, deoxygenated and pressurized with nitrogen as described under Method I. The autoclave is heated to 180° C. under autogenous pressure. A previously prepared solution comprising 2.8 ml. (0.015 mole) of ditertiary-butyl peroxide in 6.0 ml. of solvent is added. Gas chromatographic analyses indicate that 38% of the total 1-octene charge (0.057 mole) is converted to other structures within 0.2 hour, with a selectivity to linear monoalkylated aromatic of 45 percent being obtained. The 150 ml. liquid residue containing the product is stirpped of volatiles at 50° C., using a rotary evaporation device under a vacuum of about 15 mm. of mercury. After analysis indicates the absence of product, the distillate is discarded and the product contained in the residue, after stripping, is isolated by chromatography on neutral alumina. Elemental, infra-red, nuclear magnetic resonance, and mass spectrometric analyses confirm that the desired linear alkylated aromatic addition product is formed. Gas chromatographic analysis data establishes that a 17 mole percent yield of product (based on converted 1-octene) of a linear alkylated product is obtained.

Part B.—In a related run the above procedure (Method I) is repeated, except that 0.0075 mole of a $C_8$ to $C_{14}$ mixture of alpha olefins (1-octene to 1-tetradecene) is reacted at 180° C. for 2 hours with 1.50 moles of toluene and 0.015 mole of t-butylperoxide in a pressurized autoclave. Again g.c. analysis indicates the formation of a substantial quantity of the linear monoalkylated aromatic.

Part C.—In another similar run using the experimental procedure of Method I, Example 1, Part A, is repeated except that 1.50 moles of n-propyl benzene is substituted for toluene, using the same olefin (1-octene, 0.015 mole) and catalyst (t-butyl peroxide, 0.015 mole). Gas chromatographic analysis is used to confirm that the desired linear alkylated benzene is produced.

Part D.—In yet another comparable run the addition of toluene to 1-octene is accomplished repeating Part A above exactly as to molarity, temperatures, procedures and type of autoclave used. The only difference is that 0.015 mole of t-butyl hydroperoxide is substituted for t-butylperoxide. Again, g.c. analysis indicates that good conversions and selectivities are obtained.

Part E.—In still a further related embodiment Part A is repeated exactly except that 1-eicosene is employed as the 1-alkene. Once more g.c. analysis confirms that good conversions and selectivities are obtained.

EXAMPLES 2–10

Addition of toluene to various olefins using tertiary butylperoxide as initiator Using the procedure of Method I, 9 runs are made using toluene and the indicated olefin at the designated reaction pressures, temperatures and molar ratios of toluene:olefins:t-butylperoxide. Table I shows the conversion of the olefin and the selectivity of the reaction to produce linear alkylated benzene.

As can be seen in Table I, which follows, aliphatic and internal aliphatic olefins are 40–60 percent converted to other products when tertiary butyl-peroxide is used as catalyst. Selectivities to linear alkylates range from 38–62 percent when olefins greater than $C_2$ and $C_3$ are reacted. The failure of toluene to add to cyclohexene at average reaction parameters suggests that the lower carbon number ($C_5$–$C_7$) cyclic olefins may not be suitable olefins for the inventive process. Similarly Examples 5 and 6 demonstrate that temperatures of at least 175° C. and up are required for product formation.

TABLE I.—FREE RADICAL INITIATION OF TOLUENE TO VARIOUS OLEFINS

| Example number | Olefin | Mole ratio of toluene/olefin/initiator | RX temp., °C. | RX time, hours | Percent conversion of olefin | Percent selectivity to linear alkylates | Method I or II |
|---|---|---|---|---|---|---|---|
| 2 | Ethylene | 20/1/0.40 | 180 | 2 | 40 | 20 | I |
| 3 | Propene | 21/1/0.65 | 180 | 3 | 59 | 17 | I |
| 4 | Cyclohexene | 50/1/1.5 | 180 | 5 | 30 | 0 | I |
| 5 | 1-octene | 100/1/1 | 150 | 4 | 0 | 0 | I |
| 6 | do | 100/1/1 | 180 | 0.2 | 38 | 45 | I |
| 7 | 2-octene | 50/1/1.5 | 205 | 2 | 35 | 40 | I |
| 8 | 1-dodecene | 100/1/2 | 180 | 2 | 54 | 38 | I |
| 9 | 1-tetradecene | 100/1/2 | 180 | 2 | 49 | 62 | I |
| 10 | do | 50/1/1.5 | 205 | 3 | 61 | 40 | I |

As the numerous examples establish, the inventive process is advantageous and produces good selectivities as compared to the thermally catalyzed and acid catalyzed alkylations of the prior art at lower and relatively mild conditions of temperature and pressure. In addition the addition of toluene to olefins containing 20 and more carbon atoms takes place readily at these moderate reaction conditions.

In addition to the above elaborated advantages, this invention is advantageous in that numerous modifications and changes can be made without departing from the inventive concept. For instance, a wide range of alpha-olefins can be employed as coreactants and the reaction can be conducted utilizing several free radical initiators. The metes and bounds of this invention can best be understood by an examination of the claims which follow, read in the light of the preceding specification.

What is claimed is:

1. A free radical initiated process for adding toluene to mono olefin reactants containing 2 to 30 carbon atoms to form linear monoalkylated benzenes containing from 2 to 30 more carbon atoms in the monoalkyl group than were present initially consisting essentially of:
 (a) contacting each mole of said mono olefin reactants or mixtures therein, in an inert atmospheric environment, with about 20 to 150 moles of toluene, with from about 2 to 0.5 mole of tertiary-butyl peroxide, at a temperature ranging from about 175° C. to

---

[3] Toluene and its homologues.

210° C., under superatmospheric pressures of from about 100 to 300 p.s.i.g., with the proviso that all of said tertiary-butyl peroxide employed is contacted with said olefin and said toluene at one time, (b) continuing said contact of said reactants and all of said initiator at said superatmospheric pressures and temperatures for a period of time ranging from about 0.1 hour to about 10 hours to produce said linear monoalkylated benzenes containing from 2 to 30 more carbon atoms in the monoalkyl group, than were present initially, and (c) separating said linear alkylated benzenes contained therein.

2. The process of claim 1 wherein the mono-olefin reactant is an alpha ($\alpha$) olefin.

3. The process of claim 1 wherein the mono-olefin is a 2-olefin.

4. The process of claim 2 wherein the alpha-olefin is ethylene.

5. The process of claim 2 wherein the alpha-olefin is propene.

6. The process of claim 2 wherein the alpha-olefin is 1-octene.

7. The process of claim 2 wherein the alpha-olefin is 1-dodecene.

8. The process of claim 2 wherein the alpha-olefin is 1-tetradecene.

9. The process of claim 3 wherein the 2-olefin is 2-octene.

References Cited
UNITED STATES PATENTS

| | | | |
|---|---|---|---|
| 2,660,610 | 11/1953 | Erchak | 260—668 B |
| 3,051,766 | 8/1962 | Hunter et al. | 260—668 B |

CURTIS R. DAVIS, Primary Examiner